US009906680B2

(12) United States Patent
Kogusuri

(10) Patent No.: US 9,906,680 B2
(45) Date of Patent: Feb. 27, 2018

(54) INFORMATION PROCESSING SYSTEM, INFORMATION PROCESSING APPARATUS AND INFORMATION PROCESSING METHOD

(71) Applicant: Yuji Kogusuri, Kanagawa (JP)

(72) Inventor: Yuji Kogusuri, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/262,458

(22) Filed: Sep. 12, 2016

(65) Prior Publication Data
US 2017/0078522 A1    Mar. 16, 2017

(30) Foreign Application Priority Data
Sep. 15, 2015 (JP) ................... 2015-181660

(51) Int. Cl.
*H04N 1/32* (2006.01)
*G06F 11/34* (2006.01)
*H04N 1/00* (2006.01)
*G06F 11/30* (2006.01)

(52) U.S. Cl.
CPC ..... *H04N 1/32609* (2013.01); *G06F 11/3013* (2013.01); *G06F 11/3055* (2013.01); *G06F 11/3495* (2013.01); *H04N 1/00042* (2013.01); *H04N 1/00079* (2013.01); *H04N 1/00204* (2013.01); *H04N 1/00832* (2013.01); *H04N 2201/0039* (2013.01); *H04N 2201/0094* (2013.01)

(58) Field of Classification Search
CPC ........... H04N 1/32609; H04N 1/00204; H04N 1/00832; H04N 1/00042; H04N 1/00079; H04N 2201/0094; H04N 2201/0039; G06F 11/3013; G06F 11/3055; G06F 11/3495
USPC ...................................... 358/1.14
See application file for complete search history.

(56) References Cited

U.S. PATENT DOCUMENTS

2003/0077097 A1* 4/2003 Parry ............... G06F 3/121
                                                400/74
2005/0261878 A1* 11/2005 Shrivastava ....... G06F 11/0709
                                                702/186
(Continued)

FOREIGN PATENT DOCUMENTS

JP     2010-125692      6/2010
JP     5510655          6/2014

*Primary Examiner* — Allen H Nguyen
(74) *Attorney, Agent, or Firm* — Oblon, McClelland, Maier & Neustadt, L.L.P.

(57) ABSTRACT

An information processing system includes a first device and a second device coupled to the first device. The information processing system further includes a connection unit configured to establish a connection between the first device and the second device; a monitoring unit configured to cause the first device and the second device to perform live monitoring of each other, when the connection is established between the first device and the second device by the connection unit; a detection unit configured to detect an occurrence of an error in the first device or the second device by using the monitoring unit; and a saving unit configured to save log information including a log of the error, after the first device and the second device are restarted, when the occurrence of the error is detected by the detection unit.

9 Claims, 11 Drawing Sheets

(56) References Cited

U.S. PATENT DOCUMENTS

| | | | | |
|---|---|---|---|---|
| 2010/0231944 A1* | 9/2010 | Takahashi | ........... | G06F 11/0733 358/1.13 |
| 2011/0029818 A1* | 2/2011 | Saito | ................... | G06F 11/0766 714/37 |
| 2011/0078515 A1* | 3/2011 | Yasukawa | ........... | G06F 11/0733 714/48 |
| 2015/0039937 A1* | 2/2015 | Yamashita | .......... | G06F 11/0721 714/10 |

* cited by examiner

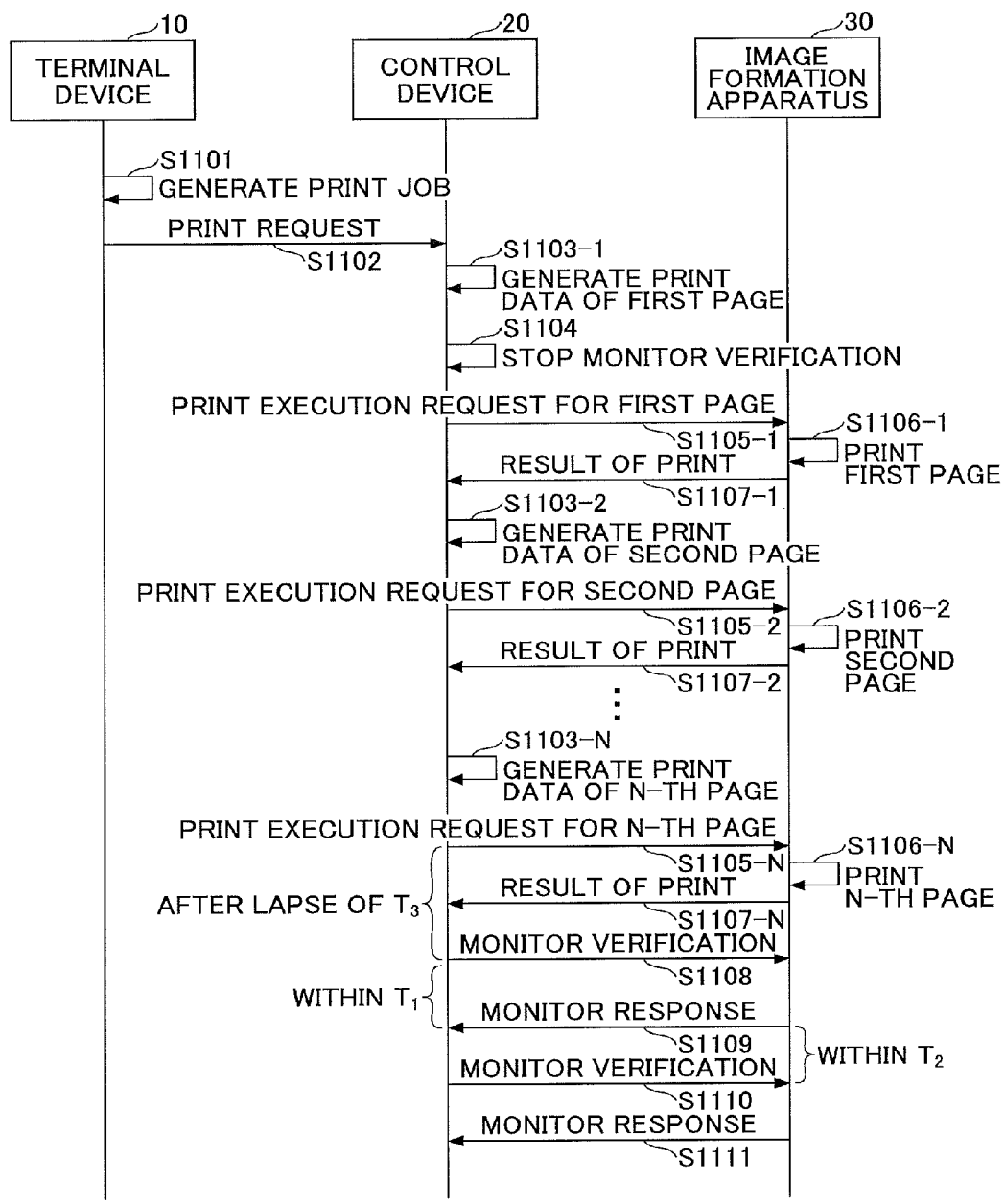

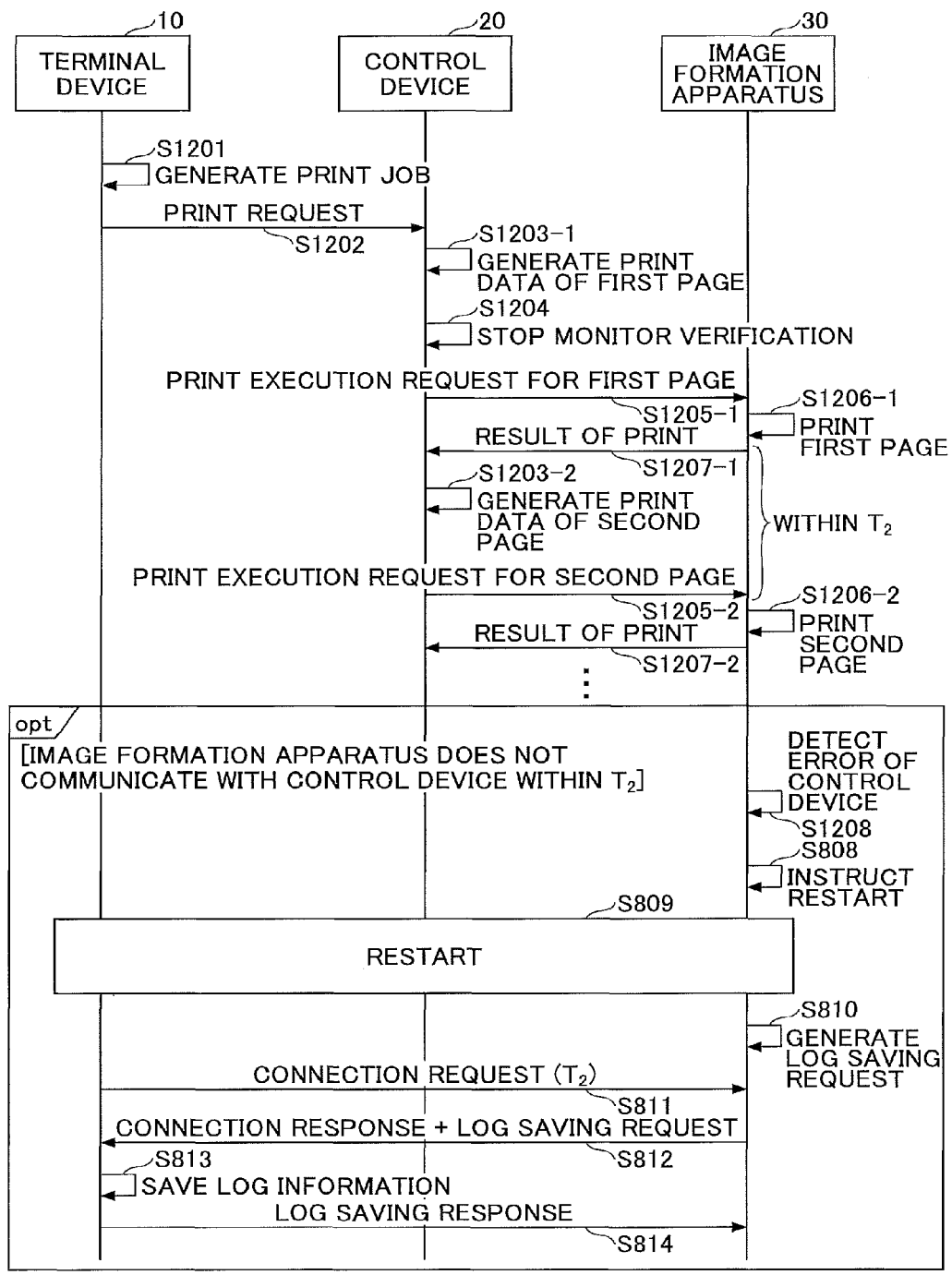

INFORMATION PROCESSING SYSTEM, INFORMATION PROCESSING APPARATUS AND INFORMATION PROCESSING METHOD

CROSS-REFERENCE TO RELATED APPLICATIONS

The present application claims benefit of priority under 35 U.S.C. § 119 of Japanese Patent Application No. 2015-181660, filed Sep. 15, 2015. The contents of this application are incorporated herein by reference in their entirety.

BACKGROUND OF THE INVENTION

1. Field of the Invention

The disclosures herein generally relate to an information processing system, an information processing apparatus and an information processing method.

2. Description of the Related Art

A technique referred to as production printing for printing a great amount of documents for business use, such as documents of high resolution or the like has been known. In the production printing, printing or the like is performed in an image forming apparatus coupled to a DFE (Digital Front End). In such a DFE or an image forming apparatus, when an occurrence of an error or the like is detected, log information pertaining to the occurrence of the error or the like is saved in a predetermined memory area.

Moreover, there is a technique for saving log information in a predetermined memory area by a sub CPU (Central Processing Unit), when a main CPU installed on the image forming apparatus is hung up or the like (See, for example, Japanese Patent No. 5510655).

SUMMARY OF THE INVENTION

It is a general object of at least one embodiment of the present invention to provide an information processing system, an information processing apparatus, and an information processing method that substantially obviate one or more problems caused by the limitations and disadvantages of the related art.

In one embodiment, an information processing system includes a first device and a second device coupled to the first device. The information processing system further includes a connection unit configured to establish a connection between the first device and the second device; a monitoring unit configured to cause the first device and the second device to perform live monitoring of each other, when the connection is established between the first device and the second device by the connection unit; a detection unit configured to detect an occurrence of an error in the first device or the second device by using the monitoring unit; and a saving unit configured to save log information including a log of the error, after the first device and the second device are restarted, when the occurrence of the error is detected by the detection unit.

BRIEF DESCRIPTION OF THE DRAWINGS

Other objects and further features of embodiments will become apparent from the following detailed description when read in conjunction with the accompanying drawings, in which:

FIG. 11 is a sequence diagram depicting an example of a monitoring process according to the second embodiment; and FIG. 12 is a sequence diagram depicting another example of the monitoring process according to the second embodiment.

DESCRIPTION OF THE PREFERRED EMBODIMENTS

In the following, embodiments of the present invention will be described with reference to the accompanying drawings.

First Embodiment

<System Configuration>

Figure 1:
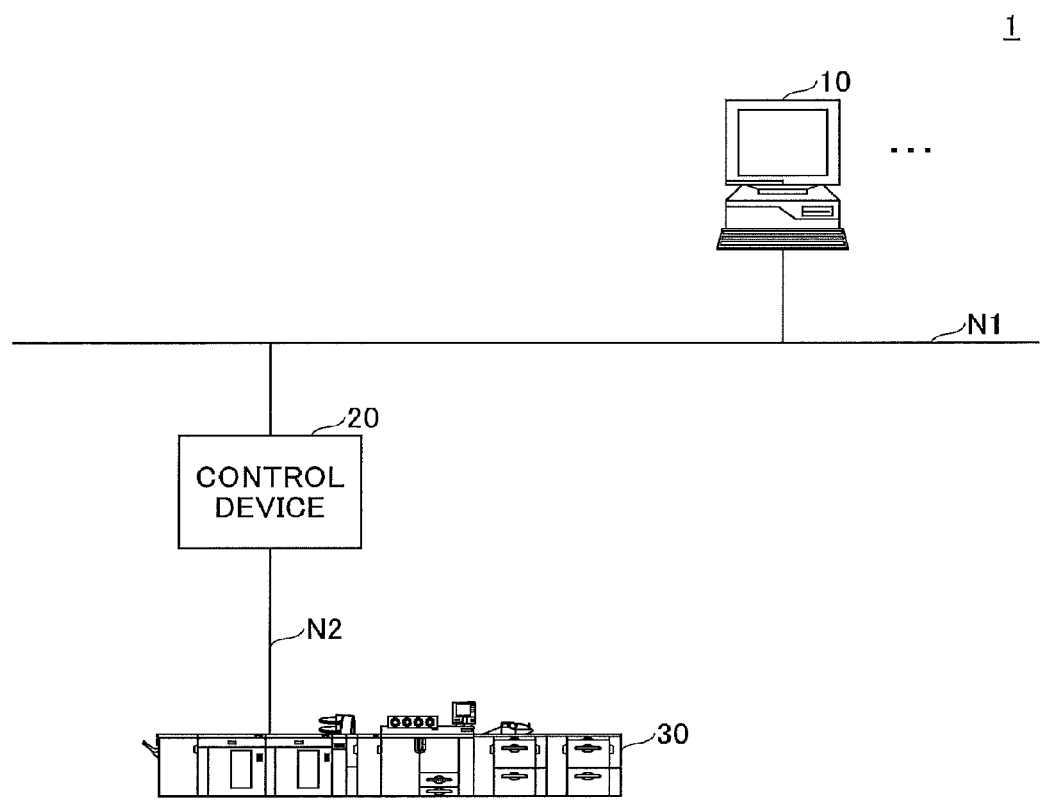
FIG. 1 is a diagram depicting an example of a system configuration of a print system according to a first embodiment.

At first a print system 1 according to a first embodiment will be described with reference to FIG. 1. FIG. 1 is a diagram depicting an example of a system configuration of the print system according to the first embodiment.

The print system 1 according to the first embodiment includes a terminal device 10, a control device 20 and an image forming apparatus 30. The terminal device 10 and the control device 20 are coupled to each other for a communications connection via a network N1 such as a LAN (Local Area Network). Moreover, the control device 20 and the image forming apparatus 30 are coupled to each other for a communications connection via a broadband network N2 such as a gigabit Ethernet LAN.

The terminal device 10 is a desktop PC (personal computer) that a user of the print system 1 uses, a laptop PC or the like. The terminal device 10 can accept an operation of the user and generate a print job. The terminal device 10 may be a smartphone, a tablet type terminal, a gaming machine or the like.

The control device 20 is a DFE or the like. One or more image forming apparatuses 30 are coupled to the control device 20 via the network N2. Based on a print job received from the terminal device 10, the control device 20 generates print data printable at the image forming apparatus 30 and sends the data to the image forming apparatus 30.

Moreover, the control device 20 acquires and manages information pertaining to a variety of logs such as an operation log or an error log in the control device 20. In the following, the information pertaining to such a variety of logs will be referred to as "log information".

The image forming apparatus 30 is, for example, a printer for production (production printer) or an MFP (Multifunction peripheral). The image forming apparatus 30 prints print data received from the control device 20.

Moreover, the image forming apparatus 30 acquires and manages log information in the image forming apparatus 30, in the same way as the control device 20.

In the print system 1 according to the first embodiment, live monitoring (active/non-active check) is performed between the control device 20 and the image forming apparatus 30 for each other, and thereby an occurrence of some error is detected for each other. That is, the control device 20 detects an occurrence of some error in the image forming apparatus 30, when after sending monitor verification to the image forming apparatus 30, any monitor response to the monitor verification has not been returned. Moreover, the image forming apparatus 30 determines (detects) an occurrence of some error in the control device 20, when after sending monitor verification to the control device 20, next monitor verification has not been received.

Then, in the print system 1 according to the first embodiment, when an occurrence of an error is detected, a user is reported to be prompted to restart the control device 20 and the image forming apparatus 30. After restarting the control device 20 and the image forming apparatus 30, log information of the device (the control device 20 or the image forming apparatus 30) in which an error occurs is saved in a predetermined memory area.

In this way, in the print system 1 according to the first embodiment, the control device 20 and the image forming apparatus 30 detect errors of each other. Therefore, in the print system 1 according to the first embodiment, for example, without installing a plurality of CPUs in a device, even when an error, by which a CPU stops, such as freeze or hang up, occurs, log information can be saved.

<Hardware Configuration>

Figure 2:
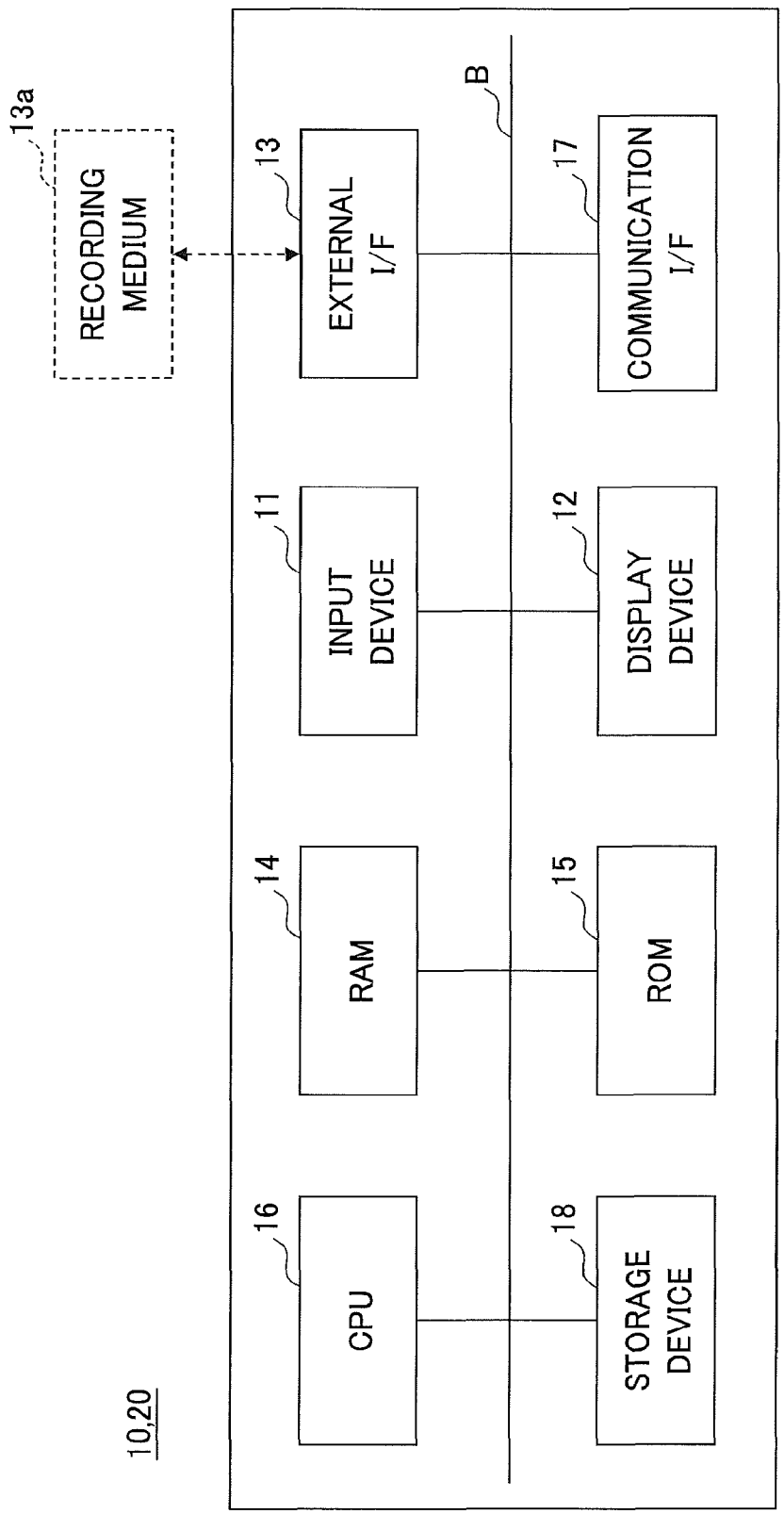
FIG. 2 is a diagram depicting an example of a hardware configuration of a terminal device and a control device according to the first embodiment.

Next, a hardware configuration of the print system 1 according to the first embodiment will be described. At first, a hardware configuration of the terminal device 10 and the control device 20 included in the print system 1 according to the first embodiment will be explained with reference to FIG. 2 FIG. 2 is a diagram depicting an example of the hardware configuration of the terminal device and the control device according to the first embodiment. Because the terminal device 10 and the control device 20 have the same hardware configuration, in the following, mainly the hardware configuration of the control device 20 will be described.

The control device 20 includes an input device 11, a display device 12, an external I/F 13, and a RAM (Random Access Memory) 14. Moreover, the control device includes a ROM (Read-Only Memory) 15, a CPU 16, a communication I/F 17, and a storage device 18. These pieces of hardware are coupled to each other via a bus B.

The input device 11 is a touch panel, a variety of buttons or the like, and used for performing a variety of operations for the control device 20. For the input device 11, a keyboard, a mouse or the like may be used. The display device 12 is a display or the like, and displays results of a variety of processes in the control device 20. The input device 11 and/or the display device 12 may be coupled to the bus B for use when necessary.

The external I/F 13 is an interface with an external device. The external device is, for example, a recording medium 13a, such as a CD (Compact Disk), a DVD (Digital Versatile Disk), an SD memory card, or a USB (Universal Serial Bus) memory. The control device 20 can read/write from/into the recording medium 13a via the external I/F 13.

The RAM 14 is a volatile semiconductor memory that temporarily saves a program or data. The ROM 15 is a nonvolatile semiconductor memory that can retain data even when power is off. The CPU 16 is an arithmetic device that reads out a program or data from the storage device 18, the ROM 15 or the like onto the RAM 14 and executes a variety of processes.

The communication I/F 17 is an interface for connecting the control device 20 to the network N1 and the network N2.

The storage device 18 is a nonvolatile memory that stores a program or data, and is, for example, a HDD (Hard Disk Drive) or a SSD (Solid State Drive). The program or data stored in the storage device 18 include, for example, an OS (Operating System) that is basic software for controlling the entire control device 20, a variety of programs operating on the OS or the like.

The terminal device 10 and the control device 20 according to the first embodiment can enable a variety of processes, which will be described later, by the hardware configuration illustrated in FIG. 2.

Figure 3:
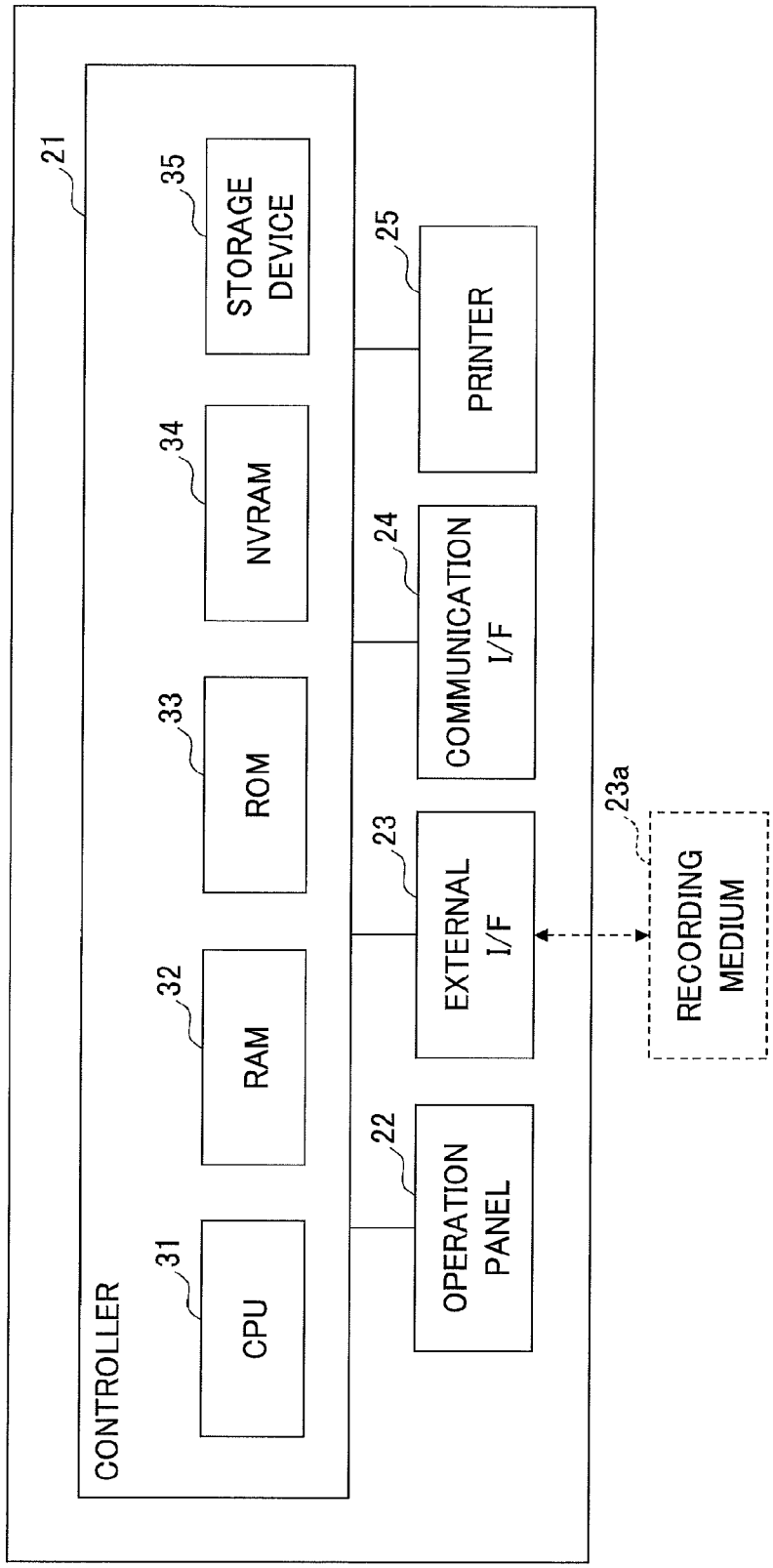
FIG. 3 is a diagram depicting an example of a hardware configuration of an image forming apparatus according to the first embodiment.

Next, a hardware configuration of the image forming apparatus 30 included in the print system 1 according to the first embodiment will be explained with reference to FIG. 3. FIG. 3 is a diagram depicting an example of a hardware configuration of the image forming apparatus 30 according to the first embodiment.

The image forming apparatus 30 includes a controller 21, an operation panel 22, an external I/F 23, a communication I/F 24, and a printer 25. Moreover, the controller 21 includes a CPU 31, a RAM 32, a ROM 33, an NVRAM 34 and a storage device 35.

The RAM 32 is a volatile semiconductor memory that temporarily saves a program or data. The ROM 33 is nonvolatile semiconductor memory that retains data even when the power is off. The NVRAM 34 stores, for example, setting information or the like. Moreover, the storage device 35 is a non-volatile memory that stores a program or data, and is a HDD or the like.

The CPU 31 reads out a program, data, setting information, or the like from the ROM 33, the NVRAM 34, the storage device 35 or the like onto the RAM 32 and executes a process, and thereby enables a control or a function of the entire image forming apparatus 30.

The operation panel 22 includes an input unit for accepting an input from a user and a display unit for performing display. The external I/F 23 is an interface with an external device. The external device includes, for example, a recording medium 23a such as a CD, a DVD, an SD memory card, or a USB drive.

The communication I/F 24 is an interface for connecting the image forming apparatus 30 to the network N2. The printer 25 is a printing device for printing print data.

The image forming apparatus 30 according to the first embodiment enables a variety of processes, which will be described later, by the hardware configuration illustrated in FIG. 3.

<Functional Configuration>

Figure 4:
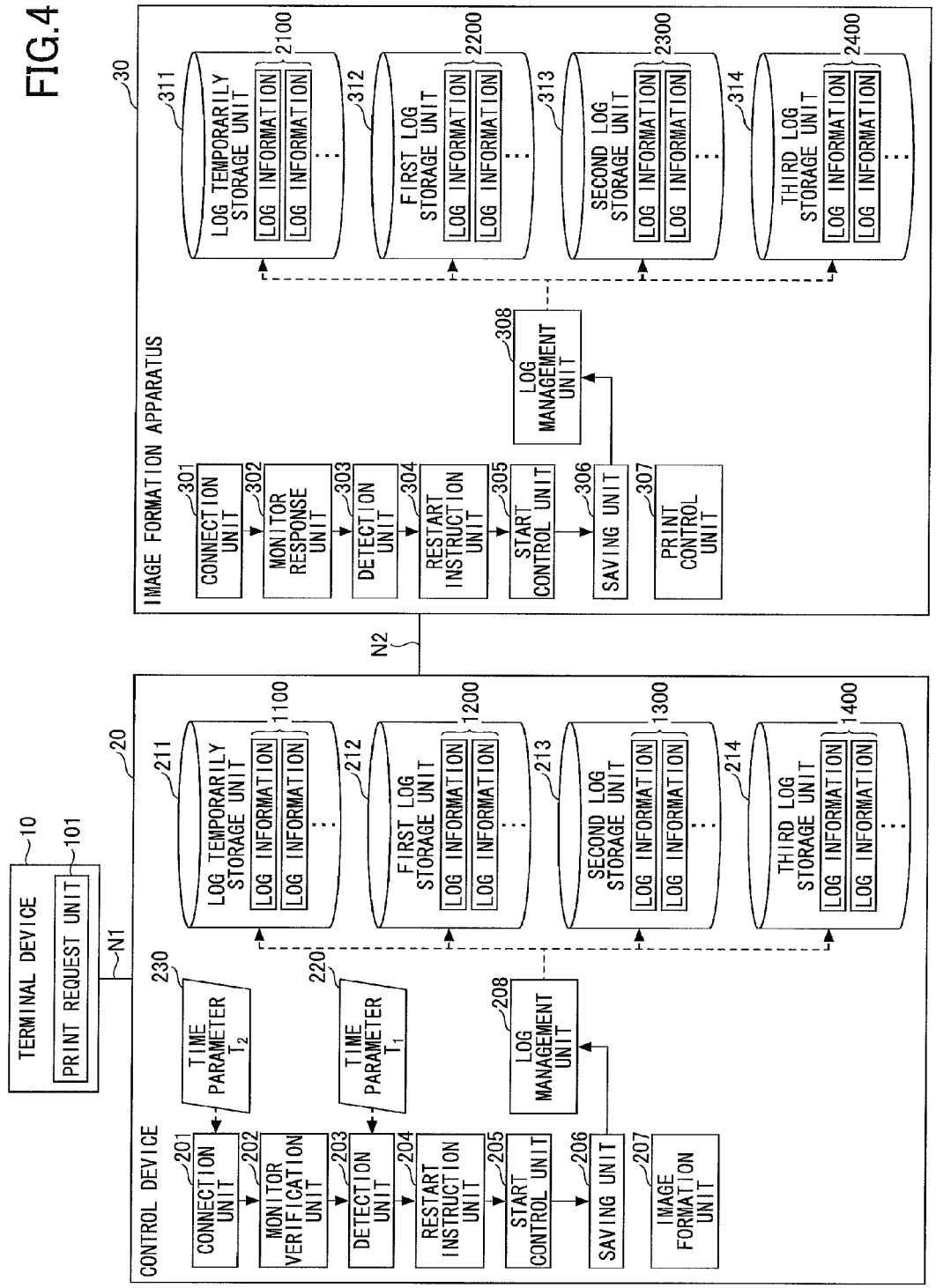
FIG. 4 is a diagram depicting an example functional configuration of the print system according to the first embodiment.

Next, a functional configuration of the print system 1 according to the first embodiment will be described with reference to FIG. 4. FIG. 4 is a diagram depicting an example of a functional configuration of the print system 1 according to the first embodiment.

The terminal device 10 includes a print request unit 101. The functional unit is enabled by a process that one or more programs installed in the terminal device 10 cause the CPU 16 to execute.

The print request unit 101 generates a print job in response to an operation by a user, and sends a print request including the print job to the control device 20. For example, when document data or image data that are print objects are specified by a user in a variety of applications, such as an image creation application, or a document preparation application and a print instruction is issued, the print request unit 101 generates print object data from the document data or the like. Then, the print request unit 101, after generating a print job including the print object data, sends the print request including the print job to the control device 20.

The print object data are, for example, data obtained by converting image data in the image creation application or document data in the document preparation application into a PDL (Page Document Language) format, such as PostScript, XPS or the like.

The control device 20 includes a connection unit 201, a monitor verification unit 202, a detection unit 203, a restart instruction unit 204, a start control unit 205, a saving unit 206, an image processing unit 207, and a log management unit 208. The respective units are enabled by processes that one or more programs installed in the control device 20 cause the CPU 16 to execute.

Moreover, the control device 20 includes a log temporary storage unit 211, a first log storage unit 212, a second log storage unit 213, and a third log storage unit 214. The respective units are enabled by using the storage device 18. All or a part of storage unit of the log temporary storage unit 211, the first log storage unit 212, the second log storage unit 213 and the third log storage unit 214 may be enabled by using a memory device or the like coupled to the control device 20 via a network.

The connection unit 201 sends a connection request for establishing a connection with the image forming apparatus 30 to the image forming apparatus 30. Here, the connection unit 201 sends a connection request including a time parameter $T_2$ 230 to the image forming apparatus 30. The time parameter $T_2$ 230 is information pertaining to time for detecting in the image forming apparatus 30 an occurrence of some error in the control device 20. In the following, time indicated by the time parameter $T_2$ 230 will be simply denoted as "$T_2$" or "$T_2$ time". Such time parameter $T_2$ 230 may be, for example, preliminarily set in the control device 20, or may be set by a user via the terminal device 10.

When the connection with the image forming apparatus 30 is established by the connection unit 201, the monitor verification unit 202 sends monitor verification to the image forming apparatus 30. Here, the monitor verification is, for example, a Keep Alive Packet or the like. That is, the monitor verification unit 202, for example, sends a Keep Alive Packet to the image forming apparatus 30, receives a Keep Alive response from the image forming apparatus 30, and thereby performs live monitoring for the image forming apparatus 30.

The detection unit 203 determines (detects) an occurrence of some error in the image forming apparatus 30, when, after sending the monitor verification by the monitor verification unit 202, a response (monitor response) to the monitor verification has not been received within time indicated by a time parameter $T_1$ 220. That is, the detection unit 203 detects that some error (for example, hang up or freeze) occurs in the image forming apparatus 30, when after sending the monitor verification a monitor response has not been returned within $T_1$ time from the image forming apparatus 30.

In the following, time indicated by the time parameter $T_1$ 220 will be simply denoted as "$T_1$" or "$T_1$ time". Such time parameter $T_1$ 220 may be, for example, preliminarily set in the control device 20, or may be set by a user via the terminal device 10.

When an occurrence of an error is detected by the detection unit 203, the restart instruction unit 204 gives notice to (reports) a user to prompt to restart the control device 20 and the image forming apparatus 30.

The start control unit 205 restarts the control device 20 in response to an operation by the user.

In a case where the detection unit 203 detects an occurrence of some error in the image forming apparatus 30, when the control device 20 is restarted by the start control unit 205, the saving unit 206 generates a log saving request for saving log information in the image forming apparatus 30. Then, the saving unit 206 sends the generated log saving request to the image forming apparatus 30. Therefore, the log information is saved in the image forming apparatus 30 after restarting.

The image processing unit 207 generates print data from print object data included in a print request received from the terminal device 10. Then, the image processing unit 207 sends a print execution request including the generated print data to the image forming apparatus 30. The print data are data obtained by performing a RIP process (also referred to as "RIP" or "ripping") for the print object data.

The log management unit 208 manages log information in the control device 20. That is, the log management unit 208, in response to an operation of the control device 20, an occurrence of an error, or the like, stores the operation or log information of the error in the log temporary storage unit 211. Moreover, the log management unit 208, in response to the reception of log saving request from the image forming apparatus 30 by the saving unit 206, saves log information 1100 stored in the log temporary storage unit 211.

The log temporary storage unit 211 stores log information 1100 stored by the log management unit 209 in response to an operation of the control device 20, an occurrence of an error, or the like. Here, the log temporary storage unit 211 is a ring buffer or the like that stores a predetermined number of pieces of log information.

For example, in a case where the log information 1100 includes log information $1100_1$, log information $1100_2$, and log information $1100_3$, when new log information $1100_4$ is stored in the log temporary storage unit 211 by the log management unit 209, the oldest log information $1100_1$ is deleted. In this way, in the log temporary storage unit 211, when new log information is stored by the log management unit 209, the oldest log information included in the log information 1100 is deleted.

The first log storage unit 212, the second log storage unit 213, and the third log storage unit 214 store pieces of log information saved in response to the log saving request from the image forming apparatus 30 for respective generations. That is, when the saving unit 206 receives the log saving request from the image forming apparatus 30, at first, the log management unit 208 stores log information 1300 stored in the second log storage unit 213 into the third log storage unit 214 as log information 1400. Next, the log management unit 208 stores log information 1200 stored in the first log storage unit 212 into the third log storage unit 214 as the log information 1300. Subsequently, the log management unit 208 stores the log information 1100 stored in the log temporary storage unit 211 into the first log storage unit 212 as the log information 1100. In this way, in the control device 20 according to the first embodiment, pieces of log information of three generations are saved. The generations of log information saved in the control device 20 are not limited to three generations, but pieces of log information of arbitrary number of generations may be saved.

The image forming apparatus 30 includes a connection unit 301, a monitor response unit 302, a detection unit 303, a restart instruction unit 304, a start control unit 305, a saving unit 306, a print control unit 307, and a log management unit 308. The respective units are enabled by processes that one or more programs installed in the image forming apparatus 30 cause the CPU 31 to execute.

Moreover, the image forming apparatus 30 includes a log temporary storage unit 311, a first log storage unit 312, a second log storage unit 313, and a third log storage unit 314. The respective units are enabled by using the storage device 35.

When a connection request is received from the control device 20, the connection unit 301 replies with a connection response in order to establish a connection with the control device 20. Therefore, a connection between the control device 20 and the image forming apparatus 30 is established. That is, a logical communication path (e.g. a session) is established between the control device 20 and the image forming apparatus 30.

When monitor verification is received from the control device 20, the monitor response unit 302 replies with a monitor response to the control device 20. Here, the monitor response is a response to the monitor verification, and is, for example, a keep-alive response. The monitor response unit 302, for example, by receiving a keep-alive packet from the control device 20, performs live monitoring for the control device 20.

When, after sending the monitor response by the monitor response unit 302, and next monitor verification has not been received within $T_2$ time, the detection unit 303 determines (detects) that some error occurs in the control device 20. That is, when after sending the monitor response, next monitor verification has not been received within $T_2$ time from the control device 20, the detection unit 303 detects that some error (e.g. hang-up or freeze) occurs in the control device 20.

When the detection unit 303 detects an occurrence of an error, the restart instruction unit 304 gives notice to (reports) a user to prompt to restart the control device 20 and the image forming apparatus 30.

The start control unit 305 restarts the image forming apparatus 30 in response to an operation of a user.

In a case where the detection unit 303 detects that some error occurs in the control device 20, when the start control unit 305 restarts the image forming apparatus 30, the saving unit 306 generates a log saving request in order to save log information in the control device 20. Then, the saving unit 306 sends the generated log saving request to the control device 20. Therefore, the log information is saved in the control device 20 after restarting.

The print control unit 307 controls printing of print data included in a print execution request received from the control device 20. That is, the print control unit 307 controls the printer 25 to perform printing of print data included in the print execution request.

The log management unit 308 manages log information in the image forming apparatus 30. That is, the log management unit 308, in response to an operation of the image forming apparatus 30, an occurrence of an error or the like, stores log information of the operation or the error in the log temporary storage unit 311. Moreover, the log management unit 308, in response to receiving by the saving unit 306 a log saving request from the control device 20, saves log information 2100 stored in the log temporary storage unit 311.

The log temporary storage unit 311, in response to an operation of the image forming apparatus 30, an occurrence of an error or the like, saves log information 2100 stored by the log management unit 308. Here, the log temporary storage unit 311, in the same way as the log temporary storage unit 211 of the control device 20, is a ring buffer or the like that stores a predetermined number of pieces of log information.

The first log storage unit 312, the second log storage unit 313, and the third log storage unit 314 store pieces of log information saved in response to the log saving request from the control device 20 for respective generations.

That is, when the saving unit 306 receives the log saving request from the control device 20, at first, the log management unit 309 stores log information 2300 stored in the second log storage unit 313 into the third log storage unit 314 as log information 2400. Next, the log management unit 308 stores log information 2200 stored in the first log storage unit 312 into the third log storage unit 314 as the log information 2300. Subsequently, the log management unit 308 stores the log information 2100 stored in the log temporary storage unit 311 into the first log storage unit 312 as the log information 2200. In this way, in the image forming apparatus 30 according to the first embodiment, pieces of log information of three generations are saved. The generations of log information saved in the image forming apparatus 30 are not limited to three generations, but pieces of log information of arbitrary number of generations may be saved.

<Details of Process>

Next, a process of the print system 1 according to the first embodiment will be described in detail.

Figure 5:
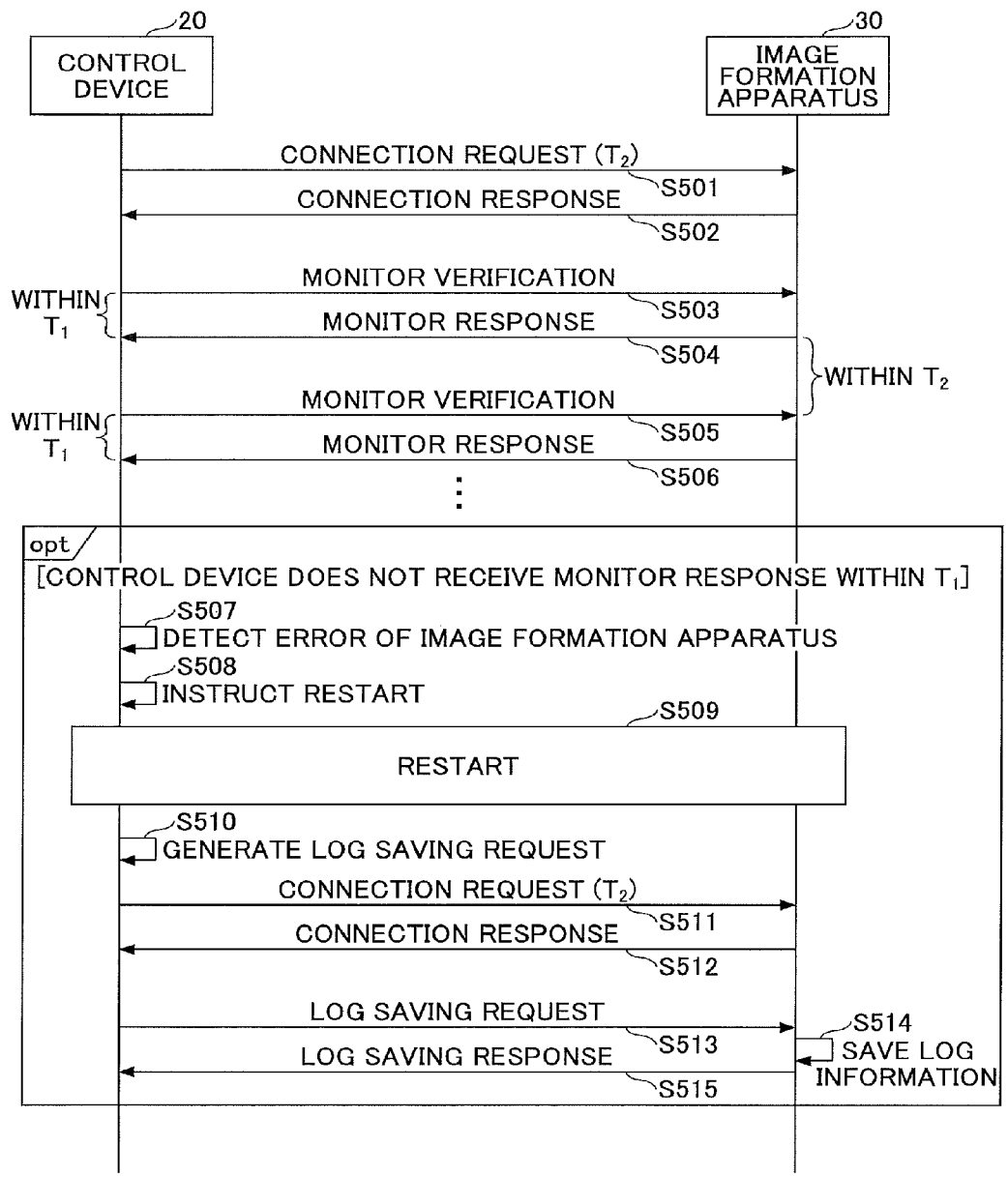
FIG. 5 is a sequence diagram depicting an example of a monitoring process according to the first embodiment.

At first, a process in a case where some error occurring in the image forming apparatus 30 is detected in a monitoring process, in which the control device 20 and the image forming apparatus 30 perform live monitoring of each other, will be described with reference to FIG. 5. FIG. 5 is a sequence chart depicting an example of a monitoring process according to the first embodiment.

At first, the connection unit 201 of the control device 20 sends a connection request in order to establish a connection with the image forming apparatus 30 to the image forming apparatus 30 (step S501). Here, the connection request includes a time parameter $T_2$ 230.

The connection unit 201 may send the connection request to the image forming apparatus 30, for example, in response to a start-up of the control device 20.

When the connection request is received from the control device 20, the connection unit 301 of the image forming apparatus 30 replies with a connection response in order to establish a connection with the control device 20 (step S502). Therefore, a connection is established between the control device 20 and the image forming apparatus 30, and communication becomes possible.

When the connection with the image forming apparatus 30 is established by the connection unit 201, the monitor verification unit 202 of the control device 20 sends monitor verification to the image forming apparatus 30 (step S503).

When monitor verification is received from the control device 20, the monitor response unit 302 of the image forming apparatus 30 sends a monitor response to the received monitor verification to the control device 20 (step S504).

Here, the control device 20 is assumed to receive the monitor response sent from the image forming apparatus 30 at step S504 within $T_1$ time from the transmission of the monitor verification at step S503. That is, the control device 20 is assumed to receive a monitor response within $T_1$ time from sending monitor verification. The time $T_1$ is, for example, about several tens of seconds to a few minutes.

Next, when a monitor response is received from the image forming apparatus 30, the monitor verification unit 202 of the control device 20 sends monitor verification to the image forming apparatus 30 after a predetermined time ($<T_2$) (step S505). That is, the monitor verification unit 202 of the control device 20 sends next monitor verification to the image forming apparatus 30. The time $T_2$ is, for example, about several tens of seconds to a few minutes.

Here, the image forming apparatus 30 is assumed to receive the monitor verification sent from the control device 20 at step S505 within $T_2$ time from sending the monitor response at step S504. That is, the image forming apparatus 30 is assumed to receive next monitor verification within $T_2$ time from sending the monitor response. The time $T_2$ is, for example, about several tens of seconds to a few minutes.

When monitor verification is received from the control device 20, the monitor response unit 302 of the image forming apparatus 30 sends monitor response to the received monitor verification to the control device 20 (step S506).

In this way, in the print system 1 according to the first embodiment, by sending/receiving monitor verification and monitor response between the control device 20 and the image forming apparatus 30, live monitoring of each other is performed. That is, the control device 20 and the image forming apparatus 30 execute repeatedly the processes of step S503 through step S506, as described above, and thereby perform live monitoring of each other.

In the print system 1 according to the first embodiment, the processes of step S503 through step S506 are executed in the background. That is, for example, even when the RIP process is performed for print object data included in the print job sent from the print request unit 101 of the terminal device 10 by the image processing unit 207, the control device 20 sends monitor verification to the image forming apparatus 30 in the background. Similarly, for example, even when print data sent from the image processing unit 207 of the control device 20 are printed by the print control unit 307, the image forming apparatus 30 replies with a monitor response to the control device 20 in the background.

Here, when a monitor response is not received within $T_1$ time from sending monitor verification, the detection unit 203 of the control device 20 detects that some error occurs in the image forming apparatus 30 (step S507). In this way, when monitor response is not performed within $T_1$ time from sending monitor verification, the control device 20 according to the first embodiment considers that some error occurs in the image forming apparatus 30, and determines (detects) the error.

Next, when the detection unit 203 detects that some error occurs in the image forming apparatus 30, the restart instruction unit 204 of the control device 20 gives notice to (reports) a user to prompt to restart the control device 20 and the image forming apparatus 30 (step S508). At that time, the restart instruction unit 204 stores predetermined information pertaining to generating a log saving request after restarting, for example, in a non-volatile memory, such as the storage device 18.

Figure 6:
FIG. 6 is a diagram depicting an example of a restart instruction screen.

Here, the restart instruction unit 204 displays, for example, a restart instruction screen 3000, illustrated in FIG. 6, on the display device 12 of the terminal device 10 or the display device 12 of the control device 20. Therefore, the user can be caused to perform the restart operation for the control device and the image forming apparatus 30.

The start control unit 205 of the control device 20 restarts the control device 20 in response to an operation of the user. Similarly, the start control unit 305 of the image forming apparatus 30 restarts the image forming apparatus 30 in response to an operation of the user (step S509).

Next, when the control device 20 is restarted by the start control unit 205, the saving unit 206 of the control device 20 generates a log saving request (step S510). The saving unit 206 may generate the log saving request, for example, according to whether predetermined information is stored in a non-volatile memory, such as the storage device 18.

Next, the connection unit 201 of the control device 20 sends a connection request to the image forming apparatus 30 (step S511). The connection request includes time parameter $T_2$ 230.

When a connection request is received from the control device 20, the connection unit 301 of the image forming apparatus 30 replies with a connection response (step S512). Therefore, a connection is established between the control device 20 and the image forming apparatus 30, and communication becomes possible.

The saving unit 206 of the control device 20 sends the log saving request generated at step S510 to the image forming apparatus 30 (step S513).

When a log saving request is received from the control device 20 by the saving unit 306, the log management unit 308 of the image forming apparatus 30 saves log information 2100 stored in the log temporary storage unit 311 (step S514). The log saving process at the step will be described later in detail.

When the log information 2100 is saved by the log management unit 308, the saving unit 306 of the image forming apparatus 30 replies with a log saving response indicating that the log is saved to the control device 20 (step S515).

As described above, in the print system 1 according to the first embodiment, live monitoring is performed between the control device 20 and the image forming apparatus 30. Then, in the print system 1 according to the first embodiment, when the control device 20 does not receive a monitor response within a predetermined time from the image forming apparatus 30, considering that some error occurs in the image forming apparatus, log information of the image forming apparatus 30 is saved after restarting. Therefore, in the image forming apparatus 30 according to the first embodiment, for example, even when an error by which the CPU 31 stops, such as a freeze or a hang-up occurs, the log information can be saved.

Figure 7:
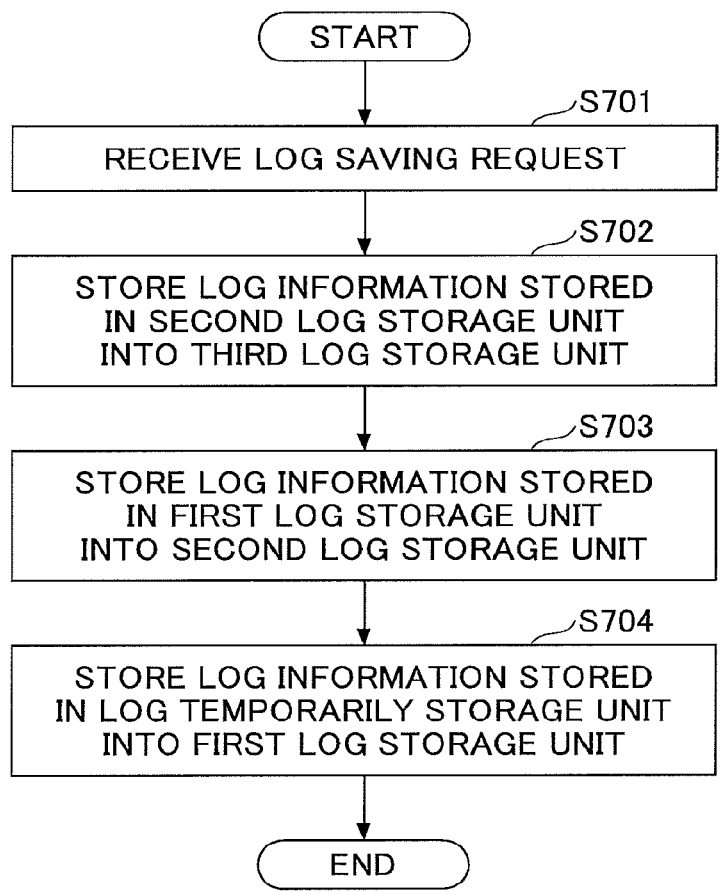
FIG. 7 is a flowchart depicting an example of a log saving process in the image forming apparatus according to the first embodiment.

Next, the log saving process at step S514, described as above, will be explained with reference to FIG. 7. FIG. 7 is a flowchart depicting an example of a log saving process in the image forming apparatus according to the first embodiment.

The saving unit 306 of the image forming apparatus 30 receives a log saving request from the control device 20 (step S701).

When the saving unit 306 receives a log saving request, the log management unit 308 of the image forming apparatus 30 stores log information 2300 stored in the second log storage unit 313 in the third log storage unit 314 as log information 2400 (step S702).

Next, the log management unit 308 of the image forming apparatus 30 stores log information 2200 stored in the first log storage unit 312 in the second log storage unit 313 as log information 2300 (step S703).

Subsequently, the log management unit 308 of the image forming apparatus 30 stores log information 2100 stored in the log temporary storage unit 311 in the first log storage unit 312 as log information 2200 (step S704).

Accordingly, the log information 2100 including log information pertaining to an error occurring in the image forming apparatus 30 is saved in the first storage unit 312. Moreover, the log information 2200 stored in the first storage unit 312 is stored in the second log storage unit 313. The log information 2300 stored in the second log storage unit 313 is stored in the third log storage unit 314. In this way, in the image forming apparatus 30 according to the first embodiment, pieces of log information of a plurality of generations are retained, and thereby various maintenance works such as identifying causes of errors that occur can be performed effectively.

Figure 8:
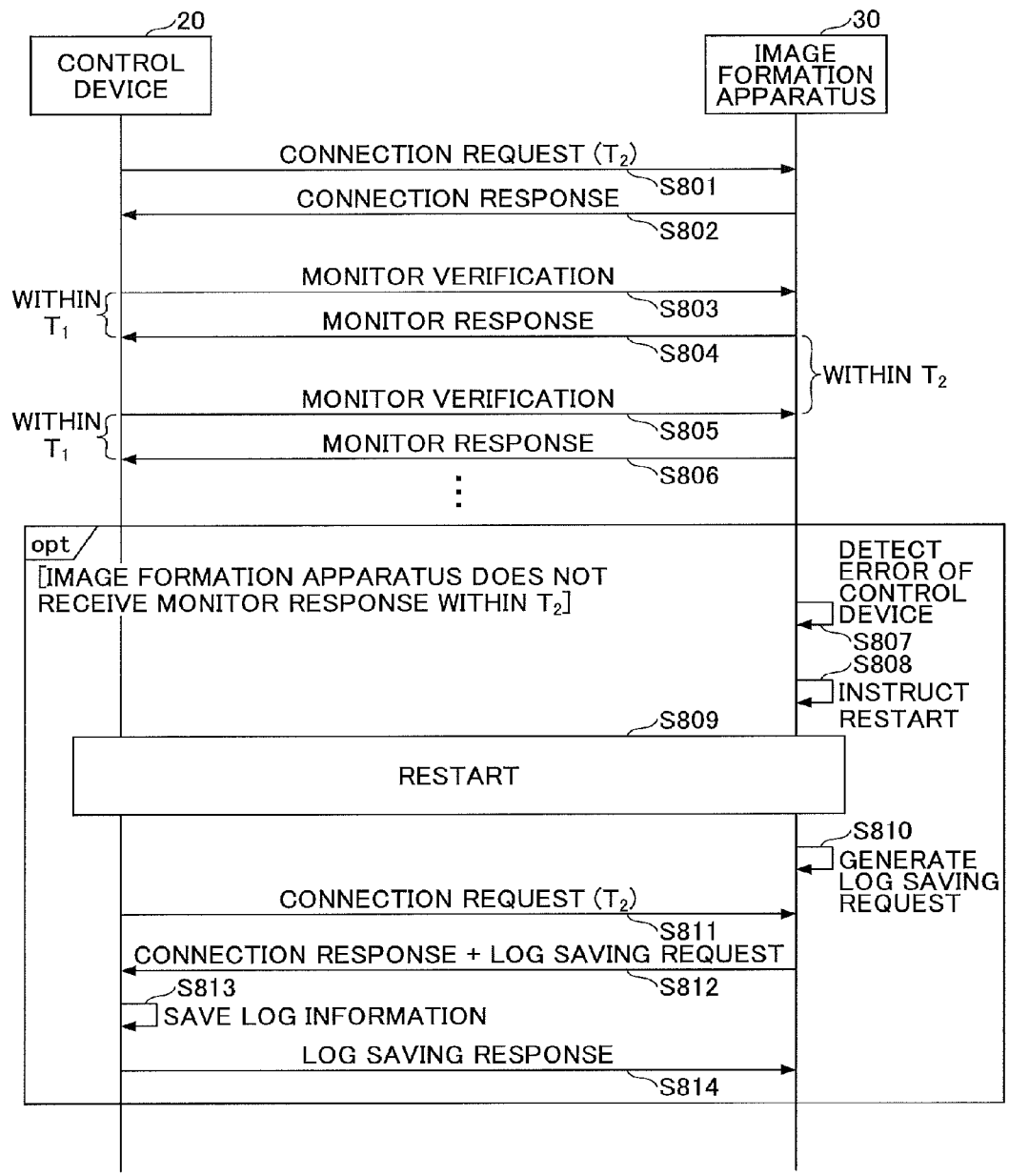
FIG. 8 is a sequence diagram depicting another example of the monitoring process according to the first embodiment.

Next, a process in a case where, in a monitoring process, in which the control device 20 and the image forming apparatus 30 perform live monitoring of each other, some error occurring in the control device 20 is detected, will be described with reference to FIG. 8. FIG. 8 is a sequence diagram depicting another example of the monitoring process according to the first embodiment.

Processes at step S801 through step S806 in FIG. 8 are the same as the processes at step S501 through step S506 described in FIG. 5. Therefore, an explanation for the steps will be omitted.

Here, when, within $T_2$ time from sending a monitor response to monitor verification, next monitor verification has not been received, the detection unit 303 of the image forming apparatus 30 detects that some error occurs in the control device (step S807). In this way, when, within $T_2$ time from sending a monitor response to monitor verification, next monitor verification has not been received, the image forming apparatus 30 according to the first embodiment considers that some error occurs in the control device 20, and determines (detects) the error.

Next, when the detection unit 303 detects that some error occurs in the control device 20, the restart instruction unit 304 of the image forming apparatus 30 gives notice (reports) to a user to prompt to restart the control device 20 and the image forming apparatus 30 (step S808). At this time, the restart instruction unit 304 stores predetermined information pertaining to generating a log saving request after restarting, for example, in a non-volatile memory such as the storage device 35.

Here, the restart instruction unit 304, in the same way as the restart instruction unit 204 of the control device 20, for example, may display a restart instruction screen 3000, as illustrated in FIG. 6, on the operation panel 22 of the image forming apparatus 30.

The start control unit 205 of the control device 20, in response to an operation of the user, restarts the control device 20. Similarly, the start control unit 305 of the image forming apparatus 30, in response to an operation of the user, restarts the image forming apparatus 30 (step S809).

Next, when the start control unit 305 restarts the image forming apparatus 30, the saving unit 306 of the image forming apparatus 30 generates a log saving request (step S810). The saving unit 306 may, for example, in response to predetermined information stored in a non-volatile memory such as the storage device 35, generate the log saving request.

In contrast, the connection unit 201 of the control device 20 sends a connection request to the image forming apparatus 30 (step S811).

When the connection request is received from the control device 20, the connection unit 301 of the image forming apparatus 30 sends a connection response and the log saving request generated at step S810 to the control device 20 (step S812). In this way, the image forming apparatus 30 according to the first embodiment sends the log saving request to the control device 20 along with the connection response to the connection request. However, the present invention is not limited to this, but the image forming apparatus 30 may send the log saving request to the control device 20 after returning the connection response to the control device 20.

When the saving unit 206 receives the log saving request from the image forming apparatus 30, the log management unit 208 of the control device 20 saves log information 1100 stored in the log temporary storage unit 211 (step S813). The log saving process at the step will be described later in detail.

When the log management unit 208 saves the log information 1100, the saving unit 206 of the control device 20 replies with a log saving response indicating that log is saved to the image forming apparatus 30 (step S814).

As described above, in the print system 1 according to the first embodiment, live-monitoring is performed between the control device 20 and the image forming apparatus 30. Then, in the print system 1 according to the first embodiment, when the image forming apparatus does not receive next monitor verification within a predetermined time from the control device 20, some error is considered to occur in the control device 20, and log information of the control device 20 is saved after restarting. Therefore, in the control device 20 according to the first embodiment, for example, even when an error, by which the CPU 16 stops, such as freeze or hang up, occurs, log information can be saved.

Figure 9:
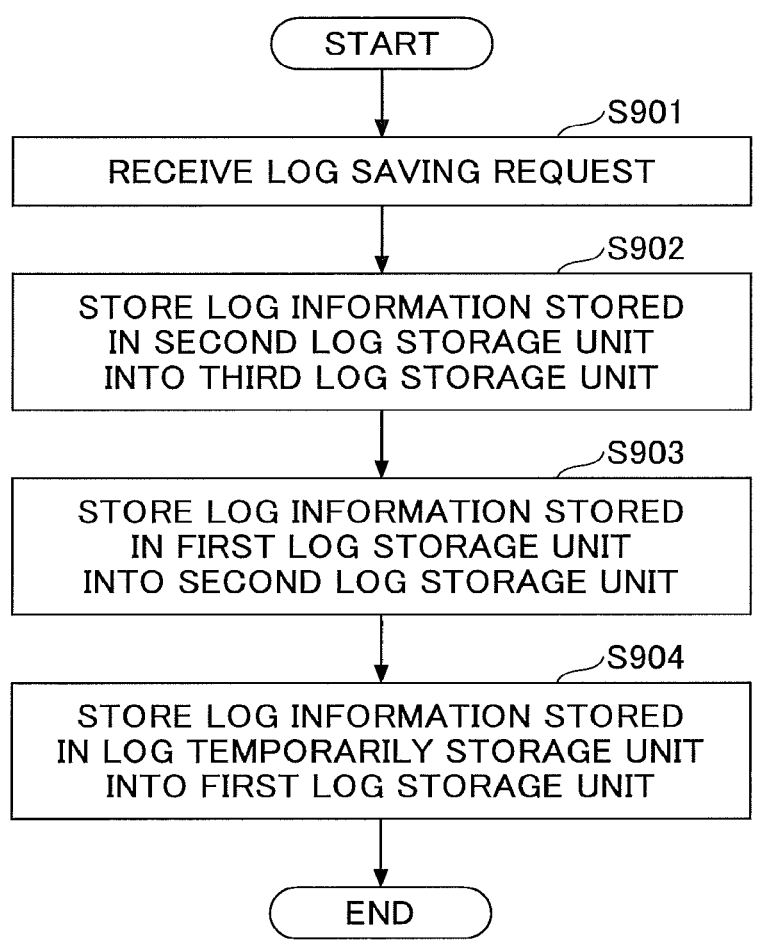
FIG. 9 is a flowchart depicting an example of a log saving process in the control device according to the first embodiment.

Next, the log saving process at step S813 will be described in detail with reference to FIG. 9. FIG. 9 is a flowchart depicting an example of the log saving process in the control device according to the first embodiment.

The saving unit 206 of the control device 20 receives a log saving request from the image forming apparatus 30 (step S901).

When the saving unit 206 receives a log saving request, the log management unit 208 of the control device 20 stores log information 1300 stored in the second log storage unit 213 in the third log storage unit 214 as log information 1400 (step S902).

Next, the log management unit 208 of the control device 20 stores log information 1200 stored in the first log storage unit 212 in the second log storage unit 213 as log information 1300 (step S903).

Subsequently, the log management unit 208 of the control device 20 stores log information 1100 stored in the log temporary storage unit 211 in the first log storage unit 212 as log information 1200 (step S904).

Accordingly, the log information 1100 including log information pertaining to an error occurring in the control device 20 is saved in the first storage unit 212. Moreover, the log information 1200 stored in the first storage unit 212 is stored in the second log storage unit 213. The log information 1300 stored in the second log storage unit 213 is stored in the third log storage unit 214. In this way, in the control device 20 according to the first embodiment, pieces of log information of a plurality of generations are retained, and thereby various maintenance works such as identifying causes of errors that occur can be performed effectively.

In the technique disclosed in Japanese Patent No. 5510655, the image forming apparatus is required to be provided with two CPUs, i.e. a main CPU and a sub CPU. Therefore, there is a problem that a hardware cost of the image forming apparatus becomes high.

According to the first embodiment, saving log information when an error occurs can be supported.

Second Embodiment

Next, the print system 1 according to a second embodiment will be described. The second embodiment is different from the first embodiment in that a monitoring process is not performed when some process is performed between the control device and thee image forming apparatus 30. Therefore, in the print system 1 according to the second embodiment, communications traffic required for the monitoring process between the control device 20 and the image forming apparatus 30 can be reduced. In the following, for a member that has substantially the same function as in the first embodiment, the same reference numeral used in the first embodiment will be used, and an explanation thereof will be omitted.

<Functional Configuration>

Figure 10:
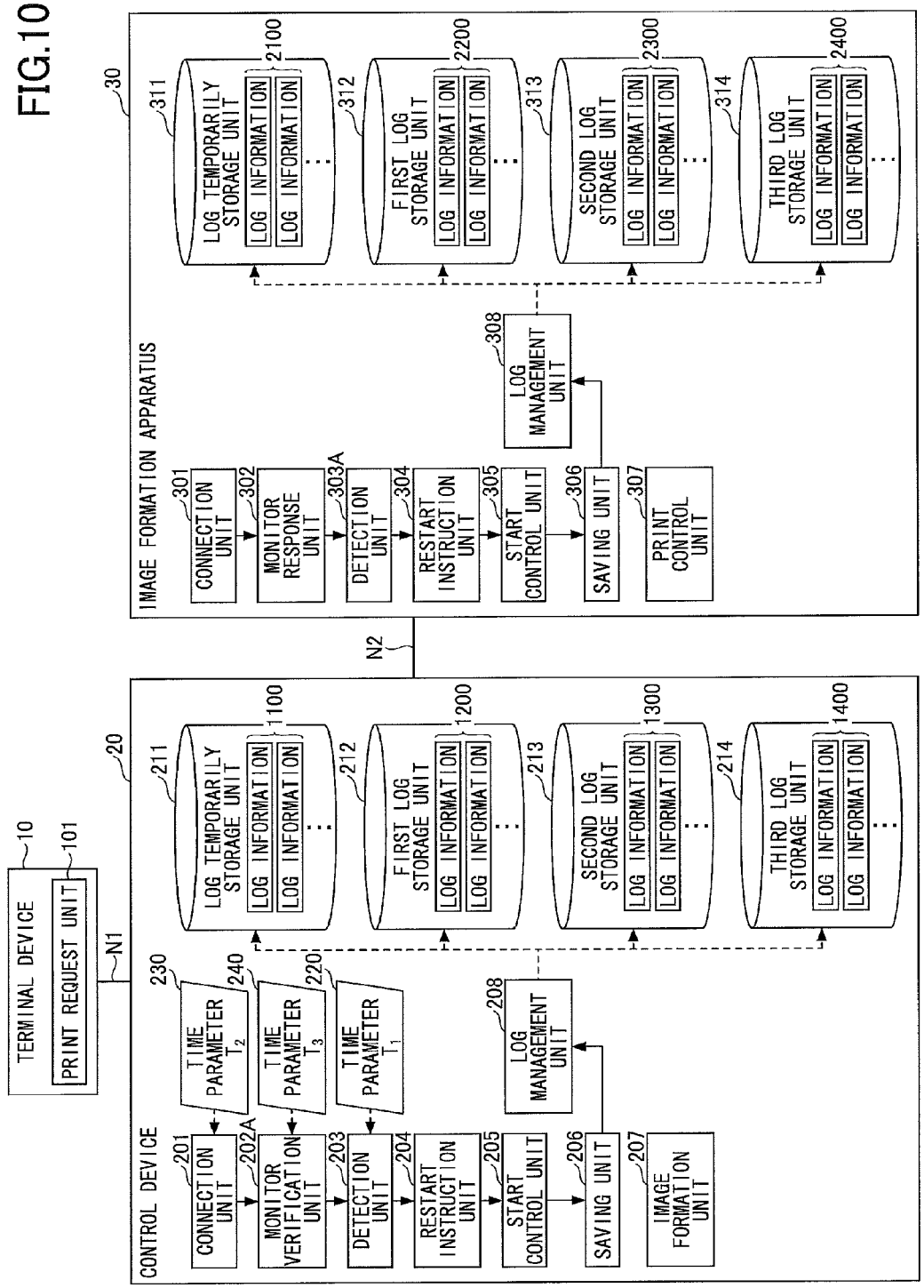
FIG. 10 is a diagram depicting an example functional configuration of a print system according to a second embodiment.

Next, a functional configuration of the print system 1 according to the second embodiment will be described with reference to FIG. 10. FIG. 10 is a diagram depicting an example functional configuration of the print system according to the second embodiment.

The control device 20 according to the second embodiment includes a monitor verification unit 202A. When communication with the image forming apparatus 30 is not performed and a time period indicated by a time parameter $T_3$ 240 has elapsed, the monitor verification unit 202A sends monitor verification to the image forming apparatus 30. That is, when the time period indicated by the time parameter $T_3$ 240 has elapsed since communication has been performed with the image forming apparatus 30, the monitor verification unit 202A sends monitor verification to the image forming apparatus 30.

Moreover, when some communication other than monitor verification is performed with the image forming apparatus 30, the monitor verification unit 202A stops sending monitor verification.

In the following, time indicated by the time parameter $T_3$ 240 will be simply denoted as "$T_3$" or "$T_3$ time". Such time parameter $T_3$ 240 may be, for example, preliminarily set in the control device 20, or may be set by a user via the terminal device 10.

Moreover, the image forming apparatus 30 according to the second embodiment includes a detection unit 303A. When communication with the control device 20 is not performed and the $T_2$ time has elapsed, the detection unit 303A detects that some error occurs in the control device 20. That is, when after performing some communication, not limited to the monitor verification, with the control device, $T_2$ time has elapsed without performing communication with the control device 20, the detection unit 303A detects an occurrence of an error.

<Details of Process>

Next, the process of the print system 1 according to the second embodiment will be described in detail. In the second embodiment, a monitoring process in a case where a print process is performed between the control device 20 and the image forming apparatus 30 will be explained with reference to FIG. 11. FIG. 11 is a sequence diagram depicting an example of a monitoring process according to the second embodiment. In the following, for example, the processes at step S501 and step S502 explained in FIG. 5 are assumed to have been performed between the control device 20 and the image forming apparatus 30, and a connection has been established.

At first, the print request unit 101 of the terminal device 10 generates a print job in response to an operation of a user (step S1101). Here, the print job includes print object data.

The user, for example, specifies image data or document data that are print objects in a variety of applications, such as an image creation application or a document preparation application, performs a print instruction, and thereby generates a print job including print object data.

Next, the print request unit 101 of the terminal device 10 sends a print request including the generated print job to the control device 20 (step S1102).

The image processing unit 207 of the control device 20 generates print data from the print object data included in the print request received from the terminal device 10 (step S1103-1). Here, the image processing unit 207 generates print data in a page unit. That is, the image processing unit 207 generates print data of a first page from print object data of a first page included in the print object data.

Next, the monitor verification unit 202A of the control device 20 stops sending monitor verification for the image forming apparatus 30 (step S1104).

Next, the image processing unit 207 of the control device 20 sends a print execution request including print data of the first page to the image forming apparatus 30 (step S1105-1).

The print control unit 307 of the image forming apparatus 30 controls printing of the print data of the first page included in the print execution request received from the control device 20 (step S1106-1). That is, the print control unit 307 controls the printer 25 to print the print data of the first page included in the print execution request.

When the print data of the first page are printed, the print control unit 307 of the image forming apparatus 30 replies with a print result indicating that the print data are normally printed to the control device 20 (step S1107-1).

Next, the image processing unit 207 of the control device 20 generates print data of a second page from print object data of a second page included in the print object data (step S1103-2). Then, the image processing unit 207 of the control device 20 sends a print execution request including print data of the second page to the image forming apparatus 30 (step S1105-2).

Subsequently, the print control unit 307 of the image forming apparatus 30 controls the printer 25, to print the print data of the second page included in the print execution request (step S1106-2). Then, the print control unit 307 of the image forming apparatus 30 replies with a print result indicating that the print data of the second page are normally printed to the control device 20 (step S1107-2).

Similarly, the image processing unit 207 of the control device 20 generates print data of an N-th page from print object data of an N-th page included in the print object data (step S1103-N). Next, the image processing unit 207 of the control device 20 sends a print execution request including print data of the N-th page to the image forming apparatus 30 (step S1105-N).

Subsequently, the print control unit 307 of the image forming apparatus 30 controls the printer 25, to print the print data of the N-th page included in the print execution request (step S1106-N). Then, the print control unit 307 of the image forming apparatus 30 replies with a print result indicating that the print data of the N-th page are normally printed to the control device 20 (step S1107-N).

In this way, the control device 20 according to the second embodiment generates print data for each page. Then, the image forming apparatus 30 according to the second embodiment prints the print data for each page.

Here, when, after sending a print execution request including print data of an N-th page, $T_3$ time period ($<T_2$) has elapsed without performing communication with the image forming apparatus 30, the monitor verification unit 202A of the control device 20 sends monitor verification to the image forming apparatus 30 (step S1108). That is, the control device 20 resumes sending monitor verification. The time $T_3$ is, for example, about several tens of seconds to a few minutes.

Therefore, when the N-th page is the final page of the print data, monitor verification and a monitor response are sent/received between the control device 20 and the image forming apparatus 30 (step S1109 through step S1111).

In contrast, when the N-th page is not the final page of the print data (that is, for example, when, due to an occurrence of an error in the image forming apparatus 30, $T_3$ time has elapsed without a print result being returned at step S1107-N), the control device 20 also resumes sending monitor verification. However, in this case, because an error occurs in the image forming apparatus 30, a monitor response to monitor verification sent from the control device 20 is not returned from the image forming apparatus 30. Therefore, in this case, the control device 20 and the image forming apparatus 30 execute the processes of step S507 through step S515 in FIG. 5.

Next, a process of detecting that some error occurs in the control device 20, in a case where a print process is performed between the control device 20 and the image forming apparatus 30, will be described with reference to FIG. 12. FIG. 12 is a sequence diagram depicting another example of the monitoring process according to the second embodiment.

Processes at step S1201 through step S1207-2 in FIG. 12 are the same as the processes at step S1101 through step S1107-2 in FIG. 11, respectively. However, the image forming apparatus 30 is assumed to receive a print execution request for the second page sent from the control device 20 at step S1205-2, within $T_2$ time from sending a print result at step S1207-1.

Here, when a print execution request (or monitor verification) for an (N+1)-th page is not received within $T_2$ time from sending a print result for a print execution request for an N-th page, the detection unit 303A determines (detects) that some error occurs in the control device 20 (step S1208). In this way, when within $T_2$ time from sending a print result for a print execution request, a next print execution request (or monitor verification) has not been received, the image forming apparatus 30 according to the second embodiment considers that some error occurs in the control device 20 and detects the error. Because the processes at step S808 through step S814 are the same as the first embodiment, an explanation thereof will be omitted.

As described above, in the print system 1 according to the embodiments, when communication due to some process is performed between the control device 20 and the image forming apparatus 30, the control device 20 stops sending monitor verification. In contrast, in the print system 1 according to the embodiments, when a predetermined time has elapsed since the control device 20 communicates with the image forming apparatus 30 last, the control device 20 resumes sending monitor verification.

Therefore, in the print system 1 according to the embodiments, when communication due to some process is performed between the control device 20 and the image forming apparatus 30, communications traffic associated with transmission of monitor verification can be reduced.

Moreover, in the print system 1 according to the embodiments, when communication with the control device is not performed for a predetermined time period due to some process, the image forming apparatus 30 can detect an occurrence of an error in the control device 20.

Further, the present invention is not limited to these embodiments, but various variations and modifications may be made without departing from the scope of the present invention.

What is claimed is:

1. An information processing system which includes a first device and a second device coupled to the first device, the system comprising:
at least one processor configured to:
  establish a connection between the first device and the second device;
  cause the first device and the second device to perform live monitoring of each other when the connection is established between the first device and the second device;
  detect an occurrence of an error in the first device or the second device by using the live monitoring; and
  cause one of the first device and the second device to save log information including a log of the error, after the first device and the second device are restarted, when the occurrence of the error is detected, wherein
the first device includes one of an image formation apparatus and a control device which controls the image formation apparatus, and
the second device includes the other of the image formation apparatus and the control device.

2. The information processing system according to claim 1, wherein the at least one processor is further configured to:
  cause the first device to send monitor verification to the second device; and
  cause the second device to return a monitor response to the monitor verification, caused to be sent by the first device, to the first device, and
  determine the occurrence of the error in the second device, when the first device has not received the monitor response to the monitor verification, caused to be sent by the second device, within a first predetermined time period since causing the first device to send the monitor verification.

3. The information processing system according to claim 2, wherein the at least one processor is further configured to determine the occurrence of the error in the first device, when the second device has not received a next monitor verification, caused to be sent by the first device after the monitor verification, within a second predetermined time period since causing the second device to return the monitor response.

4. The information processing system according to claim 1, wherein the at least one processor is further configured to:
give notice to a user to prompt to restart the first device and the second device when the occurrence of the error in the first device or the second device is detected, and
cause the saving of the log information after the first device and the second device are restarted by the user in response to the notice.

5. The information processing system according to claim 3, wherein the at least one processor is further configured to:
not cause the first device and the second device to perform the live monitoring while communication, which is associated with a predetermined process, is being performed between the first device and the second device, and
resume causing the first device and the second device to perform the live monitoring when a third predetermined time period elapses without the communication, which is associated with the predetermined process, being performed.

6. The information processing system according to claim 5, wherein the at least one processor is further configured to determine the occurrence of the error in the first device while the communication, which is associated with the predetermined process, is being performed between the first device and the second device, and when within the second predetermined time period since the second device sends a result of the predetermined process in response to a request for the predetermined process, the second device has not received a next request for the predetermined process, which the first device sends after the request for the predetermined process.

7. The information processing system according to claim 1,
wherein the first device is a DFE (Digital Front End), and
wherein the second device is a production printer coupled to the DFE.

8. An information processing apparatus coupled to a device, the information processing apparatus comprising:
at least one processor configured to:
establish a connection between the information processing apparatus and the device;
perform live monitoring for the device when the connection is established between the information processing apparatus and the device;
detect an occurrence of an error in the device by using the live monitoring; and
cause the device to save log information including a log of the error in the device, after the information processing apparatus and the device are restarted, when the occurrence of the error is detected, wherein
the information processing apparatus includes one of an image formation apparatus and a control device which controls the image formation apparatus, and
the device includes the other of the image formation apparatus and the control device.

9. An information processing method in an information processing system that includes a first device and a second device coupled to the first device, the method comprising:
establishing a connection between the first device and the second device;
causing the first device and the second device to perform live monitoring of each other when the connection is established between the first device and the second device;
detecting an occurrence of an error in the first device or the second device by using the live monitoring; and
causing one of the first device and the second device to save log information including a log of the error, after the first device and the second device are restarted, when the occurrence of the error is detected, wherein
the first device includes one of an image formation apparatus and a control device which controls the image formation apparatus, and
the second device includes the other of the image formation apparatus and the control device.

* * * * *